US011621972B2

(12) United States Patent
Shaya et al.

(10) Patent No.: US 11,621,972 B2
(45) Date of Patent: Apr. 4, 2023

(54) SYSTEM AND METHOD FOR PROTECTION OF AN ICS NETWORK BY AN HMI SERVER THEREIN

(71) Applicant: ICS SECURITY (2014) LTD., Nethanya (IL)

(72) Inventors: Ilan Shaya, Ness Ziona (IL); Shimon Zigdon, Nethanya (IL); Avishay Savir, Beer Sheva (IL)

(73) Assignee: ICS Security (2014) Ltd., Nethanya (IL)

( * ) Notice: Subject to any disclaimer, the term of this patent is extended or adjusted under 35 U.S.C. 154(b) by 0 days.

(21) Appl. No.: 17/704,149

(22) Filed: Mar. 25, 2022

(65) Prior Publication Data

US 2022/0217172 A1 Jul. 7, 2022

Related U.S. Application Data

(63) Continuation of application No. 17/577,110, filed on Jan. 17, 2022, now abandoned, which is a
(Continued)

(51) Int. Cl.
*H04L 29/06* (2006.01)
*H04L 9/40* (2022.01)
(Continued)

(52) U.S. Cl.
CPC ...... *H04L 63/1425* (2013.01); *H04L 41/0686* (2013.01); *H04L 43/18* (2013.01); *H04L 67/12* (2013.01); *H04L 67/535* (2022.05)

(58) Field of Classification Search
CPC ... H04L 67/535; H04L 41/0686; H04L 43/18; H04L 67/12
(Continued)

(56) References Cited

U.S. PATENT DOCUMENTS

2007/0036075 A1* 2/2007 Rothman ............ H04L 63/1408
370/230
2010/0031340 A1* 2/2010 Batke ...................... H04L 63/06
726/13
(Continued)

FOREIGN PATENT DOCUMENTS

JP 2007133650 A 5/2007

OTHER PUBLICATIONS

Modi, "A survey of intrusion detection techniques in Cloud", May 2012, Journal of Network and Computer Applications, pp. 42-57 (Year: 2012).*
(Continued)

*Primary Examiner* — Noura Zoubair
*Assistant Examiner* — Gregory A Lane
(74) *Attorney, Agent, or Firm* — Pearl Cohen Zedek Latzer Baratz LLP

(57) ABSTRACT

A defense suite for an industrial control system (ICS) network is disclosed. The defense suite is installed and executed on a network server hosting the human-machine interface (HMI) function of the network, thereby gaining communication privileges of the HMI server to query and perform other operations with programmable logic controllers (PLCs) and other assets of the network. The defense suite further comprises a network protection engine (NWPE) that alerts a defense suite user of suspicious activity in the network. Normal behavior of the network is obtained by a learning engine, during a learning period. The learning engine can be reactivated after a configuration change in the network. The data suite also comprises an operating system protection engine (OSPE), for preventing removable devices from accessing the HMI server and a preventing execution of unauthorized executables. The OSPE is also trained for
(Continued)

which programs are authorized through its own program discovery module.

6 Claims, 10 Drawing Sheets

Related U.S. Application Data continuation of application No. PCT/IL2019/050795, filed on Jul. 15, 2019.

(51) Int. Cl.
    *H04L 67/50*     (2022.01)
    *H04L 41/0686*     (2022.01)
    *H04L 43/18*     (2022.01)
    *H04L 67/12*     (2022.01)

(58) Field of Classification Search
    USPC .......................................................... 726/23
    See application file for complete search history.

(56) References Cited

U.S. PATENT DOCUMENTS

| | | | |
|---|---|---|---|
| 2014/0298399 A1* | 10/2014 | Heo | H04L 63/1416 |
| | | | 726/1 |
| 2016/0359880 A1* | 12/2016 | Pang | H04L 41/40 |
| 2017/0039372 A1 | 2/2017 | Koval et al. | |
| 2017/0163670 A1 | 6/2017 | Manadhata et al. | |
| 2020/0404010 A1* | 12/2020 | Costante | H04L 63/20 |
| 2021/0194850 A1* | 6/2021 | Johnson | H04L 63/1408 |

OTHER PUBLICATIONS

Yang et al., "Multiattribute SCADA-specific intrusion detection system for power networks", Sheffield Hallam University Research Archive, vol. 29, No. 3, pp. 1092-1102, Feb. 11, 2014.

Robert Udd, "Anomaly Detection in SCADA Network Traffic", Linköping University, Department of Computer and Information Science, 2015.

International Search Report for PCT application No. PCT/IL2019/050795, dated Oct. 6, 2019.

* cited by examiner

SYSTEM AND METHOD FOR PROTECTION OF AN ICS NETWORK BY AN HMI SERVER THEREIN

CROSS-REFERENCE TO RELATED APPLICATIONS

This application is a continuation of U.S. patent application Ser. No. 17/577,110, filed on Jan. 17, 2022, which is a continuation of PCT International Application No. PCT/IL2019/050795, international filing date Jul. 15, 2019, all of which are hereby incorporated by reference.

FIELD OF THE INVENTION

The invention is in the field of information security, and in particular for security of industrial control systems.

BACKGROUND TO THE INVENTION

Systems for protecting industrial systems are previously disclosed.

U.S. Pat. No. 8,909,926 discloses a system and methodology facilitating automation security in a networked-based industrial controller environment. Various components, systems and methodologies are provided to facilitate varying levels of automation security in accordance with security analysis tools, security validation tools and/or security learning systems. The security analysis tool receives abstract factory models or descriptions for input and generates an output that can include security guidelines, components, topologies, procedures, rules, policies, and the like for deployment in an automation security network. The validation tools are operative in the automation security network, wherein the tools perform security checking and/or auditing functions, for example, to determine if security components are in place and/or in suitable working order. The security learning system monitors/learns network traffic patterns during a learning phase, fires alarms or events based upon detected deviations from the learned patterns, and/or causes other automated actions to occur.

SUMMARY

The most common means by which devices in an ICS network, such as PLCs, are compromised is via the human-machine interface (HMI), because the HMI is affected by human mistakes and malice.

The "HMI defense suite" of the present invention is installed on an HMI server to prevent any kind of attack on the HMI server itself and to prevent the HMI server from attacking the PLCs or another asset in the ICS network.

In most cases, for safety reasons implementing new devices on ICS networks is not allowed. Installing the HMI defense suite of the present invention on an HMI server obviates the need to add new devices to the ICS network or foreign installations on the HMI server.

The present invention provides a defense suite for an industrial control system (ICS) network. The defense suite is installed and executed on a network server hosting the human-machine interface (HMI) function of the network, and thereby gains communication privileges of the HMI server to query and perform other operations with programmable logic controllers (PLCs) and other assets of the network. The defense suite further comprises a network protection engine (NWPE) that alerts a defense suite user of suspicious activity in the network. Normal behavior of the network is obtained by a learning engine, during a learning period. The learning engine can be reactivated after a configuration change in the network. The data suite also comprises an operating system protection engine (OSPE), for preventing removable devices from accessing the HMI server and a preventing execution of unauthorized executables. The OSPE is also trained for which programs are authorized through its own program discovery module.

The invention provides a non-transitory computer-readable medium (CRM), stored thereon program instructions to one or more processors of an HMI server of an ICS network, the processors and the instructions configured to provide a defense suite for protecting the ICS network, the defense suite comprising a. a packet sniffing and analysis module (PSA) module, configured to
   i. obtain data packets communicated between the HMI server and assets in the ICS network; and
   ii. extract attributes of the data packets;
b. a learning engine (LE), configured for operation during an initial learning period when the learning engine is configured to
   i. receive the data packet attributes from the PSA module;
   ii. add the attributes to one or more whitelists;
c. a database, configured for storing the whitelists; and
d. a network protection engine (NWPE), comprising one or more network protection modules configured to
   i. receive the data packet attributes from the PSA module;
   ii. compare one or more of the attributes against one or more of the whitelists; and
   iii. issue an alert upon finding a the attribute that does not appear on the whitelist; the alert displayed on a user interface of the defense suite;
e. a user interface module (DS-UI), configured to display the alerts;
f. wherein the defense suite
   i. is installed and executed within the HMI server; and
   ii. thereby has communication privileges to the assets deriving from a valid IP address and valid network configuration of the HMI server; the assets comprising one or more programmable logic controllers (PLCs).

The invention further provides the abovementioned CRM, wherein the database is further configured to store the alerts and the user interface is further configured to periodically request new alerts stored in the database.

The invention further provides any of the abovementioned CRMs, further comprising a loader configured to load generic core code of the defense suite to the operating system (HMI-OS) of the HMI server and initiate execution of defense suite.

The invention further provides any of the abovementioned CRMs, wherein the loader is a plug-in program to HMI software installed on the HMI server, installed via the HMI software.

The invention further provides any of the abovementioned CRMs, wherein the communication privileges comprise any combination of querying the PLCs using SNMP, reading tag values of the PLCs, sending engineering commands to the PLCs, querying protocols, WMI querying, opened ports querying, keep-alive querying, Telnet connection, and SSH connection.

The invention further provides any of the abovementioned CRMs, wherein the NWPE comprises an asset querying (AQ) module configured to a. send a query to a the asset;
b. receive a query reply from the asset; and
c. send the query reply to one or more of the database and the DS user interface.

The invention further provides any of the abovementioned CRMs, wherein the NWPE comprises a PLC software backup (PLC-SWBU) module configured to
a. send an UPLOAD command to one or more of the PLCs;
b. receive current software of the PLCs; and
c. store a backup copy of the software in the database.

The invention further provides any of the abovementioned CRMs, wherein the NWPE comprises an abnormal HMI behavior detection (AHB) detection module, configured to
a. monitor activity of input devices of the HMI server;
b. receive tag-related operation attribute vectors (TAVs) extracted by the PSA module from each the data packet communicated between the HMI server and the PLCs;
c. compare the extracted tag-related operations attributes with whitelisted tag-related operations attributes in a tag-related operations whitelist (TWL) file in the database; and
d. if the packet was sent from the HMI server to a PLC and extracted tag-related operation attributes are not in the tag-related operations whitelist (TWL) and is not preceded by activity of the input devices within a maximum interval before the tag-related operation, then issue a new tag-related operation (NT) alert.
e. if the packet is packet that sent from a PLC to the HMI server and the extracted tag-related operation attributes are not in the tag-related operations whitelist (TWL), then issue a new tag-related operation (NT) alert.

The invention further provides any of the abovementioned CRMs, wherein the maximum interval between the input device activity and the tag-related operation is 0.5 seconds.

The invention further provides any of the abovementioned CRMs, wherein the network protection engine further comprises a new asset (NA) detection module, configured to
a. receive identifiers of the assets extracted by the PSA module from the data packets;
b. compare the asset identifiers with whitelisted asset identifiers in an asset whitelist (AWL) file stored in the database; and
c. if a the extracted asset identifier is not in the assets whitelist, then issue a new asset (NA) alert.

The invention further provides any of the abovementioned CRMs, wherein the asset identifiers are MAC addresses, IP addresses, or any combination thereof.

The invention further provides any of the abovementioned CRMs, wherein the new asset detection module monitors and compares only one asset identifier type comprising the MAC addresses for assets on a same LAN as the HMI server resides.

The invention further provides any of the abovementioned CRMs, wherein the new asset detection module monitors and compares only one asset identifier type comprising the IP addresses for assets not residing on a same LAN as the HMI server resides.

The invention further provides any of the abovementioned CRMs, wherein the network protection engine further comprises a malicious network signatures (MNS) module configured to
a. receive raw data packets from the PSA module;
b. compare attributes of each the raw data packet with attack and exploit signatures stored in a signatures blacklist;
c. if the packet attributes match one or more of the blacklisted signatures, then issue a suspicious signature (SS) alert.

The invention further provides any of the abovementioned CRMs, wherein the network protection engine further comprises an unauthorized conversation (UC) detection module configured to
a. receive conversation attributes vectors (CAV) extracted from data packets by the PSA module, the CAVs each comprising: 1) a source IP, 2) a destination IP, 3) a transport layer protocol, 4) a source port, 5) a destination port; and 6) of the source port and destination port in a the data packet, the port that is fixed;
b. remove, of the source port and destination port, a random port of the CAV;
c. compare each the CAV with whitelisted CAVs in a conversations whitelist (CWL) file stored in the database; and
d. if a the extracted CAV is not in the conversations whitelist (CWL) file, then issue an unauthorized conversation alert (UC).

The invention further provides any of the abovementioned CRMs, wherein the learning engine further comprises a tag-related operation discovery (TOD) module, configured to
a. receive the TAVs extracted from data packets by the PSA module;
b. add the extracted TAVs to the tag-related operations whitelist (TWL) file.

The invention further provides any of the abovementioned CRMs, wherein the learning engine further comprises an asset discovery (AD) module, configured to
a. receive identifiers of the assets 7 extracted by the PSA module from the data packets;
b. add the asset identifiers to the assets whitelist file.

The invention further provides any of the abovementioned CRMs, wherein analysis of the assets received from PSA module is implemented by one or more the following
a. based on an asset discovery algorithm;
b. based on ARP packets;
c. based on SRC IP of incoming packets; and
d. based on SRC MAC and SRC IP of broadcast packets.

The invention further provides any of the abovementioned CRMs, wherein the leaning engine further comprises a conversations discovery (CD) module, configured to
a. receive the CAVs extracted from data packets by the PSA module;
b. add the extracted CAVs to the conversations whitelist file.

The invention further provides any of the abovementioned CRMs, wherein the learning period is one week.

The invention further provides any of the abovementioned CRMs, wherein the learning period is user configurable.

The invention further provides any of the abovementioned CRMs, wherein the learning engine is configured to be non-operative during operation of the network protection engine.

The invention further provides any of the abovementioned CRMs, wherein the DS user interface is configured to reactivate the learning engine, during another learning period, after the initial learning period and a period of operation of the network protection engine.

The invention further provides any of the abovementioned CRMs, wherein the PSA module extracts the attributes of data packets encoded in one or more of the following protocols: NETBIOS, LLNMR, CDP, LLDP, SNMP, and DNS.

The invention further provides any of the abovementioned CRMs, wherein the PSA module supports SCADA protocols comprising one or more of OPC, MODBUS, DNP3, Ethernet/IP, IEC61850, BACNET, Siemens S7, and PROFINET.

The invention further provides any of the abovementioned CRMs, wherein the defense suite further comprises a protocol traffic monitoring (PTM) module configured to
a. receive protocols of the assets 7 extracted by the PSA module from the data packets;
b. compute traffic volume for each the protocol; and
c. display the traffic volume by protocol on the DS-UI.

The invention further provides any of the abovementioned CRMs, further comprising a traffic volume monitoring (TVM) module configured to
a. over each of a sequence of time intervals, sum sizes of packets analyzed by the PSA and/or sent and received by the NIC; and
b. display network traffic volume, comprising the sum over each the interval, on DS user interface.

The invention further provides any of the abovementioned CRMs, wherein the defense suite further comprises an operating system protection engine (OSPE) configured to protect the operating system (HMI-OS) of the HMI server.

The invention further provides any of the abovementioned CRMs, wherein the OSPE comprises an external hardware blocking (EBB) module, configured to
a. detect connection of an external storage device to the HMI server;
b. block communication of the external storage device with the HMI server and its operating system.

The invention further provides any of the abovementioned CRMs, wherein the OSPE comprises an applications control (AC) module configured to
a. monitor executables running in the HMI-OS;
b. compute hash functions of each the executable;
c. compare the computed hash function with whitelisted hash functions in an executables whitelist (EWL) file stored in the database;
d. if the computed hash function is not in the EWL file, then block the executable.

The invention further provides any of the abovementioned CRMs, wherein the AC module is further configured to issue an unauthorized executable (UE) alert.

The invention further provides any of the abovementioned CRMs, wherein the OSPE further comprises a program discovery (PD) module configured to
a. monitor executables running in the HMI-OS;
b. compute hash function values of each the executable; and
c. add the hash function values to the EWL file.

The invention further provides a method for protecting an ICS network, implemented by one or more processors of an HMI server, the method comprising steps of
a. obtaining any one of the abovementioned CRMs;
b. extracting attributes of the data packets communicated between the HMI server and assets in the ICS network;
c. during an initial learning period, receiving and adding the extracted attributes to one or more whitelists stored on a database;
d. during a network protection period,
  i. receiving and comparing one or more of the extracted attributes against one or more of the whitelists; and
  ii. issuing an alert upon finding a the attribute that does not appear on the whitelist;
e. displaying one or more of the alerts on a user interface of the defense suite;
f. wherein the method further comprises steps of
  i. installing and executing the method within the HMI server;
  ii. thereby having communication privileges to the assets deriving from a valid IP address and valid network configuration of the HMI server; the assets comprising one or more programmable logic controllers (PLCs).

DETAILED DESCRIPTION

Figure 1:
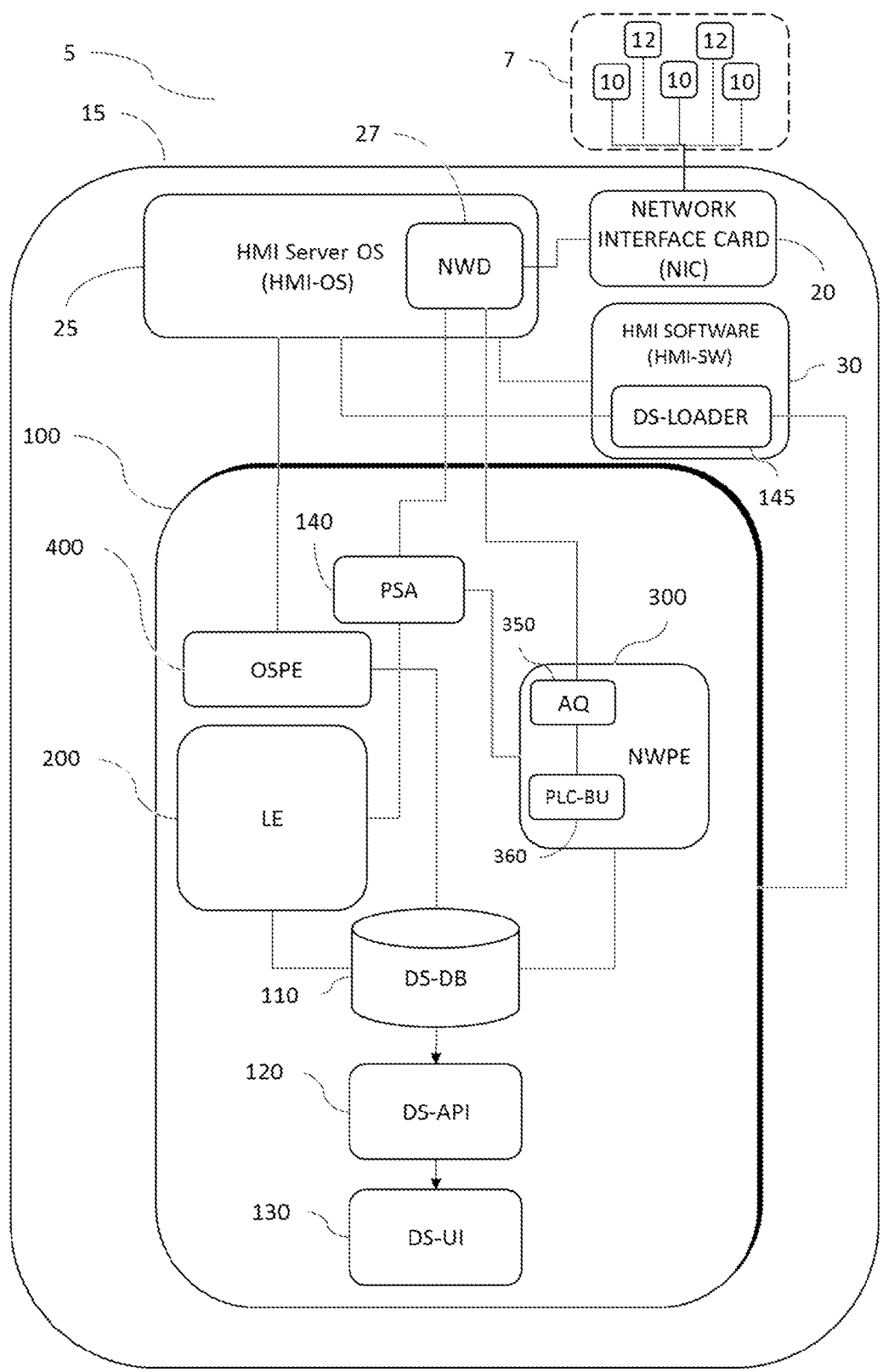
FIG. 1 shows a functional block diagram of a defense suite, according to some embodiments of the invention.

Reference is now made to FIG. 1, showing a functional block diagram of a defense suite (DS) 100, according to some embodiments of the invention.

Defense suite 100 comprises a network-security software suite installed and executed on an HMI server 15 computer. HMI server 15 provides the user interface component of an industrial control system (ICS) network 5. User interface functionality is provided by HMI software (HMI-SW) 30, installed and executed on HMI server 15. Besides HMI server 15, ICS network 5 comprises assets 7 including programmable logic controllers (PLCs) 10 (which operate in conjunction with sensors and actuators in an industrial installation, such as a power plant or factory) and other assets 12, such as one or more of any combination of engineering stations, servers, I/O units, ICS servers, networking devices, and other ICS devices.

The operating system (HMI-OS) 25 of HMI server 15 has a direct and authorized connection to assets 7. Therefore, by being installed on HMI server 15, defense suite 100 acquires an ability to communicate directly with assets 7; e.g., query a PLC using SNMP, read tag values, and send engineering commands (such as DOWNLOAD, UPLOAD, STOP). Data suite 100 employs these communication privileges, inter alia, to protect the network, as further described herein.

In some embodiments, defense suite 100 is installed by a loader 145 via a user interface of HMI software 30. Loader 145 is an external program, which may be in a form of an add-on to HMI software 30, that loads program code of defense suite 100 to HMI-OS 25, and then initiates execution of defense suite 100. Loader 145 may be customizable to particular versions (e.g., of different manufacturers) of HMI software 30.

HMI server 15 comprises a network interface card (NIC) 20. Through MC 20, HMI server 15 receives communication packets from assets 7 to HMI server 15, and sends communication packets from HMI server 15 to assets 7. Data suite 100 can access, send and receive data packets, preferably through a network driver (ND) 27 of the HMI server operating system (HMI-OS) 25.

Defense suite 100 comprises a packet sniffing and analysis (PSA) module 140. PSA module 140 receives the communicated data packets from MC 20. PSA module 140 analyzes data packets and extracts their attributes, such as information about sending and receiving assets 7 and communication protocols used. In some embodiments, PSA module 140 is enabled to sniff and analyze data packets encoded with one or more of several protocols, such as NETBIOS, LLMNR, CDP, LLDP, SNMP and DNS. Supported SCADA protocols may comprise one or more of OPC, MODBUS, DNP3, Ethernet/IP, IEC61850, BACNET, Siemens S7, and PROFINET.

PSA module 140 is further configured to generate an attribute vector comprising the following attributes of each supported SCADA protocol data packet: 140: 1) the tag's operation, 2) the tag's address, 3) the tag's value; hereinafter known as "tag-related operation attributes vector" (TAV).

PSA module 140 is further configured to generate an attribute vector comprising the following attributes of each data packet 140: 1) source IP, 2) destination IP, 3) transport layer protocol, 4) source port, and 5) destination port; hereinafter known as "conversation attribute vector" (CAV). For a given conversation, however, an unknown one of the two ports (source and destination) is randomly generated and the other is fixed. PSA module 140 employs an application layer protocol and port identification algorithm, further described in an Appendix A to this Description, to compute which of the two ports is random. PSA module 140 appends a sixth attribute, comprising the fixed port, to the conversation attribute (thereby repeating either the source or destination port). CAVs are employed by an unauthorized conversation detection module 340 (FIG. 3D; further described herein) and a conversation discovery module 210 (FIG. 4A; further described herein) of defense suite 100.

Defense suite 100 further comprises a network protection engine (NWPE) 300. NWPE 300 comprises several modules, further described herein. Modules of NWPE 300 are responsible for protecting ICS network 5, including HMI server 15 and assets 7. Two NWPE modules, an asset querying (AQ) module 350 and a PLC backup (PLC-BU) module 360 (further described herein) employ the asset communication privileges bestowed to data suite 100 by virtue of its installation and execution on HMI server 15.

NWPE 300 modules further comprises alert modules (further described herein). Alert modules request and receive particular attributes (e.g., asset identifiers, communication protocols) of data packets in network traffic retrieved by PSA module 140. Alert modules may compare the data packet attributes with whitelisted attributes stored in a particular whitelist file. When a whitelist-based alert module finds that a data packet with a particular attribute that is not on the particular whitelist was communicated, the alert module issues an alert to a user interface (UI) 130 of defense suite 100, preferably through an API (120) of defense suite 100. Additionally, one or more modules of NWPE 300 may compare the data packet attributes with blacklisted attributes stored in a particular blacklist file, as further described herein. When a blacklist-based alert module finds that a data packet with a particular attribute that is on the particular blacklist was communicated, the module issues an alert to a user interface (DS-UI) 130 of defense suite 100, preferably through an API (120) of defense suite 100. DS-UI 130 may display—e.g. visually and or audibly annunciate—the alert. A user of defense suite 100 is thereby alerted to the possible breach and can take mitigating or corrective action. Alert modules of NWPE may also send the alerts to a syslog server, if present and configured.

The whitelists are stored in a database (DS-DB) 110 of defense suite 100. Database 110 may also store a list of signatures of attacks and exploits, used by a malicious network signature detection module of NWPE 300, further described herein.

It is understood that DS-DB 110 may comprise one or more memory and/or storage locations, whether they be physical or logical locations in HMI server 15. It is further understood that some locations, such as those storing the signatures blacklist, may be part of HMI-OS 25 and/or other storage locations on one of the file-systems of the HMI server 15.

In embodiments described herein, upon issuing an alert, NWPE alert modules store alerts in database 110. DS-UI 130 periodically queries database 110 (e.g., every five minutes) for new alerts, and then displays the new alert. In the case of multiple alerts, DS-UI 130 may thereby display a summary of suspected compromises without flooding a user of DS-UI 130 with large numbers of multiple alerts displayed as soon as issued by an alert module. Nevertheless, it is understood that defense suite 100 may employ other methods for delivering alerts from alert modules of NWPE 300 to DS-UI 130.

Defense suite 100 further comprises a learning engine (LE) 200. Learning engine 200 is operable during one or more learning periods. During a learning period, modules of learning engine 200 request and receive particular attributes of data packets in network traffic retrieved by PSA module 140. The LE module stores communicated attributes in the particular whitelists, which will thereby be available to NWPE 300 during operation of defense suite 100 after the learning period.

A learning period generally occurs during an initial phase, during which defense suite 100 is being initially trained (e.g., upon installation of defense suite 100). The learning period of this initial phase may be preconfigured or defaulted to a recommended period, such as one week. Alternatively, or in addition, a user may adjust the initial learning period in the settings of defense module 100. In some embodiments, the user may start another learning period after defense module 100 has already undergone the initial learning period and NWPE 300 has been operational. This is the case, for example, when there has been a configurational change in ICS network 5. The user may retrain learning engine 200 to accommodate the new configuration of ICS network 5.

Generally, learning engine 200 is not active (is switched off) during operation of protection engines NWPE 300. Conversely, NWPE 300 is generally not active during operation of LE 200, except for the network signature detection module that remains operative during learning periods.

Figure 2A:
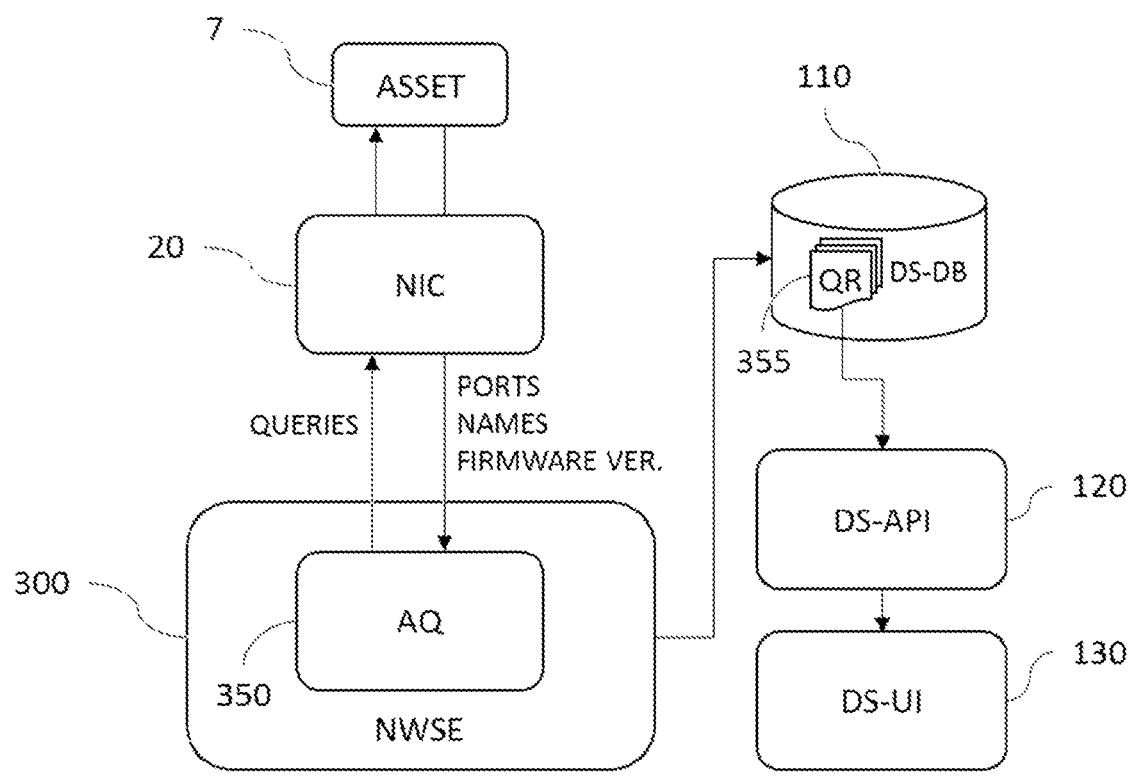
FIGS. 2A-2B show functional block diagrams of modules of a defense suite that employ asset communication privileges of the defense suite, according to some embodiments of the invention.

Reference is now made FIG. 2A, showing a functional block diagram of an asset querying (AQ) module 350 of NWPE 300, according to some embodiments of the invention.

AQ module 350 is configured to send a query to an asset 7, through MC 20, and receive query responses (QRs). AQ module 350 may employ one or more query protocols, such as SNMP queries, WMI querying, opened ports querying, keep-alive querying, Telnet connection, SSH connection.

Query responses may be stored in DS database 110 and/or displayed on DS user interface 130.

Queries and responses of AQ module 350 enable the defense suite 100 to gather important information about the assets. For example, by querying PLCs 10 for opened ports, defense suite obtains which ports of a PLC 10 are opened. Opened ports may put PLC 10 in danger (because an attacker can exploit a vulnerability in the services that are listening on these opened ports). After AQ module 350 receives a response to an opened ports query and the opened ports are displayed on DS-UI 130, a user is informed of which PLC ports are opened. Having this information, the user may decide to remove unnecessary exploitable services, thereby reducing the number of opened ports.

AQ module 350 may query and receive device names of PLCs. The PLC device names may be shown on DS-UI 130, so that a user may identify to which PLC 10 a subsequent alert of NWPE 300 refers.

Additionally, using SNMP queries, AQ module 350 can also acquire a firmware version of a PLC 10. AQ module 350 determines if there are known vulnerabilities for the existing PLC firmware version. In some embodiments, AQ module 350 may employ a signature blacklist (SBL) 332 to make the determination. If there is a vulnerability, an alert may be displayed on DS-UI 130 to a user. Based on this knowledge, a network administrator can decide to update the PLC 10 to the latest firmware version.

Figure 2B:
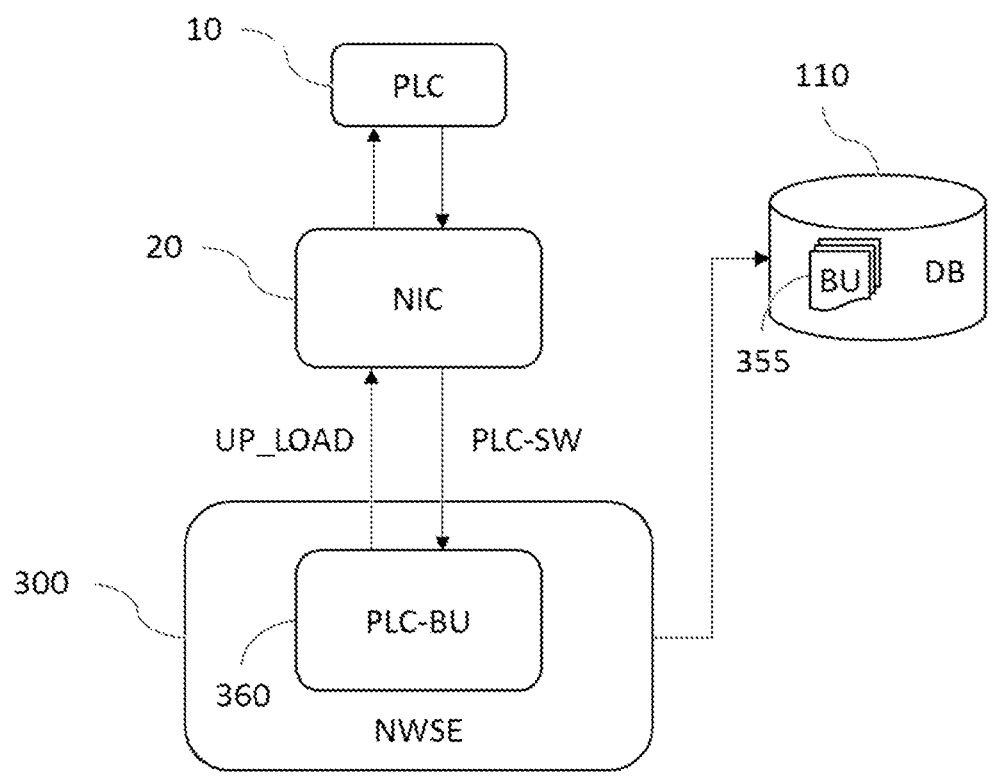

Reference is now made to FIG. 2B, showing a functional block diagram of a PLC backup (PLC-BU) module 360 of NWPE 300, according to some embodiments of the invention.

PLC-BU module issues an UPLOAD command to a PLC 10. PLC 10 replies by sending files of software which is currently operational on PLC 10. PLC-BU 360 may save the software in a backup (BU) file 365 of DS-DB.

Figure 3A:
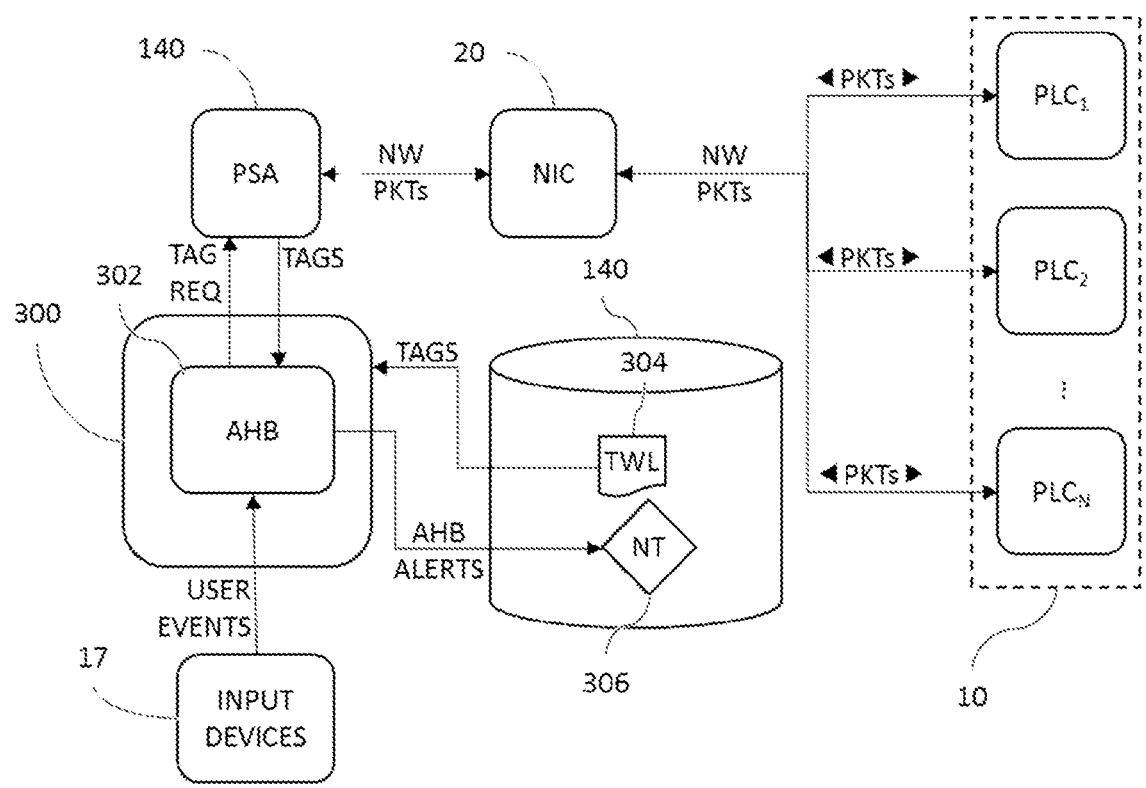
FIGS. 3A-3D show functional block diagrams of network protection modules of the defense suite, according to some embodiments of the invention.

Reference is now made to FIG. 3A, showing a functional block diagram of an abnormal HMI behavior detection (AHB) detection module 302, an alert module of NWPE 300, according to some embodiments of the invention.

In some embodiments, AHB detection module 302 is configured to
 a. monitor activity of input devices 17 of HMI server 15;
 b. receive tag-related operation attributes extracted by PSA module 140 from each data packet communicated between HMI server 15 and PLCs 10;
 c. compare extracted tag-related operations attributes with whitelisted tag-related operations attributes in a tag-related operations whitelist (TWL) file 304 in database 110; and
 d. if the packet was sent from the HMI server 15 to a PLC 10 and extracted tag-related operation attributes are not in said tag-related operations whitelist (TWL) and is not preceded by activity of said input devices within a maximum interval before said tag-related operation, then issue a new tag-related operation (NT) alert 310.
 e. if the packet is packet that sent from a PLC 10 to the HMI server 15 and said extracted tag-related operation attributes are not in said tag-related operations whitelist (TWL), then issue a new tag-related operation (NT) alert 310.

Figure 3B:
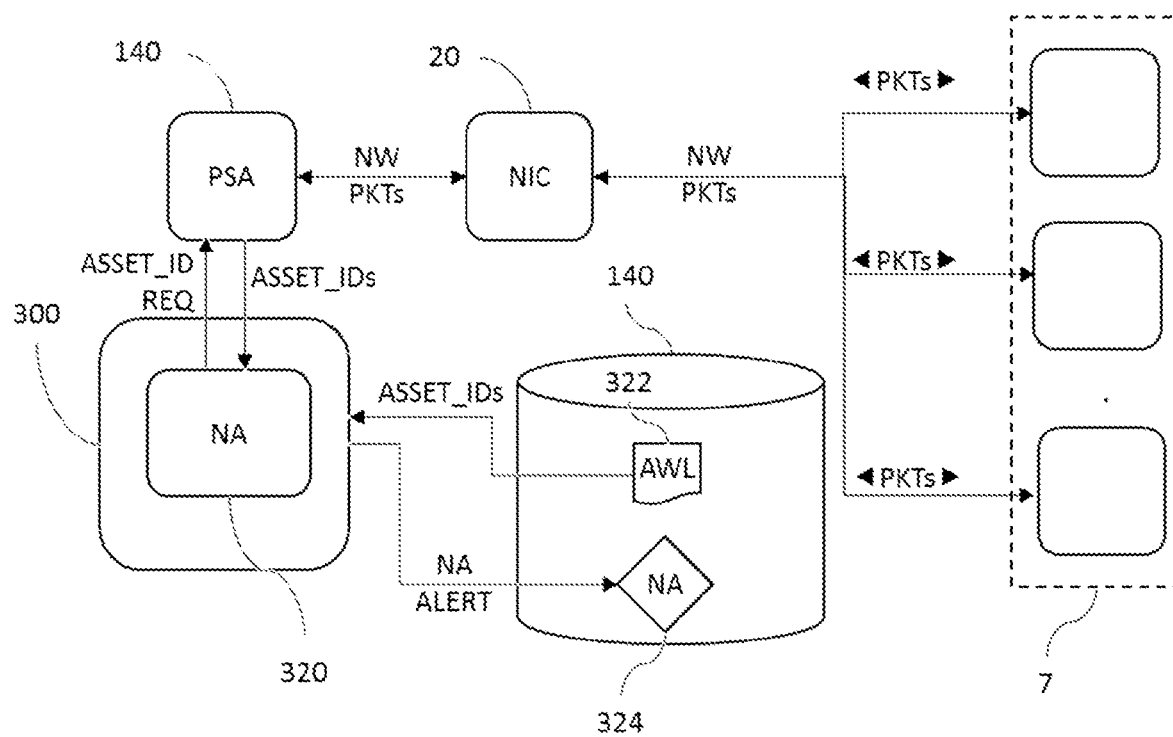

Reference is now made to FIG. 3B, showing a functional block diagram of a new asset (NA) detection module, an alert module of 320 of NWPE 300, according to some embodiments of the invention. NA detection module 320 is configured to a. request identifiers, such as MAC or IP numbers (typically MAC for local assets and IP for remote assets), of assets 7 extracted by PSA module 140 from data packets;
 b. compare the asset identifiers with whitelisted asset identifiers in an asset whitelist (AWL) file 322 stored in database 110; and
 c. if an extracted asset identifier is not in the assets whitelist, then issue a new asset (NA) alert 324.

Figure 3C:
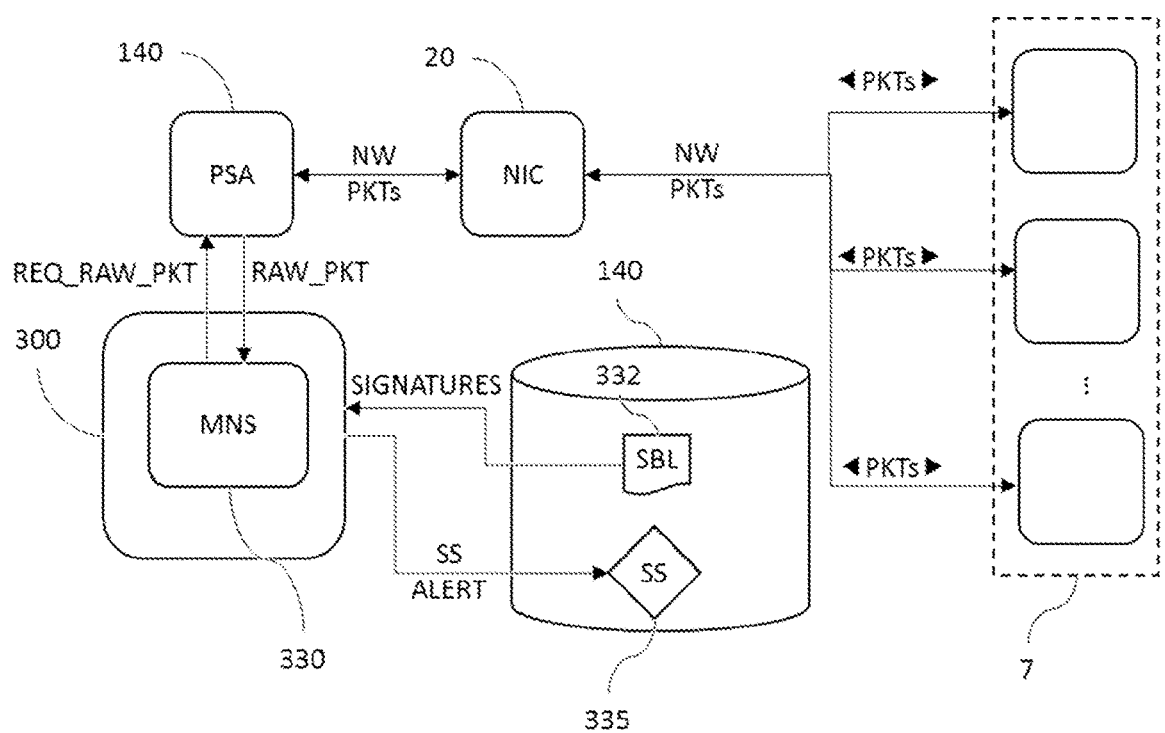

Reference is now made to FIG. 3C, showing a functional block diagram of a malicious network signatures (MNS) detection module 330, an alert module of NWPE 300, according to some embodiments of the invention. MNS detection module 330 is configured to
 a. request and receive raw data packets from NIC 20;
 b. compare raw data packets received with attack and exploit signatures stored in a signatures blacklist (SBL) 332; and
 c. if the packet attributes match one or more of the signatures in signatures blacklist 332, then issue a suspicious signature (SS) alert 335.

Figure 3D:
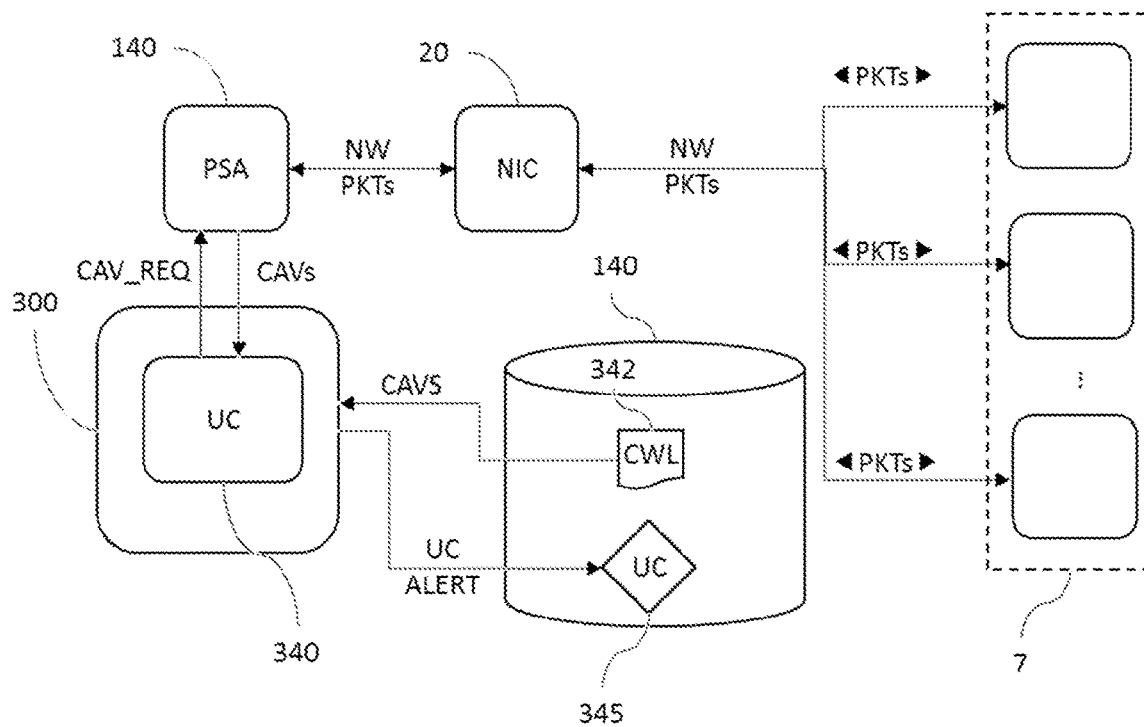

Reference is now made to FIG. 3D, showing a functional block diagram of an unauthorized conversations (UC) detection module 340, and alert module of NWPE 300, according to some 415 embodiments of the invention.

UC detection module 340 receives conversation attributes vectors (CAV), further described herein, including in association with the description of PSA module 140. UC detection module examines a port specified as a fixed port in each CAV. UC detection module compares the source IP, destination IP, transport layer protocol, and the fixed port with conversations whitelist (CWL) 342. If the CAV is not on CWL 342, an unauthorized conversation alert is issued by UC detection module 340.

Figure 4A:
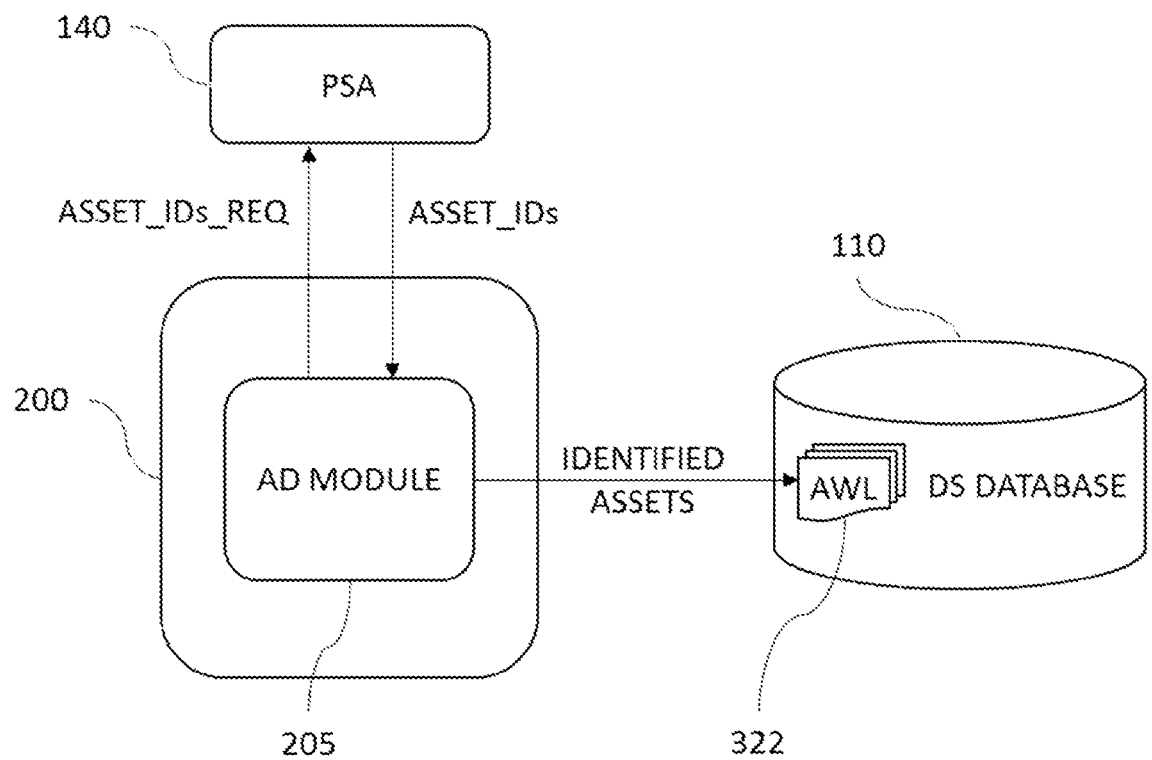
FIGS. 4A-4C show functional block diagrams of learning modules of the defense suite, according to some embodiments of the invention.

Reference is now made to FIG. 4A, showing an asset discovery (AD) module 205 of learning engine 200, according to some embodiments of the invention.

AD module 205 is configured to
 a. receive identifiers of assets 7 extracted from data packets by said PSA module 140; and
 b. add extracted identifiers to said assets whitelist file 322. Additional operational details of AD module 205 are provided in Appendix B.

Figure 4B:
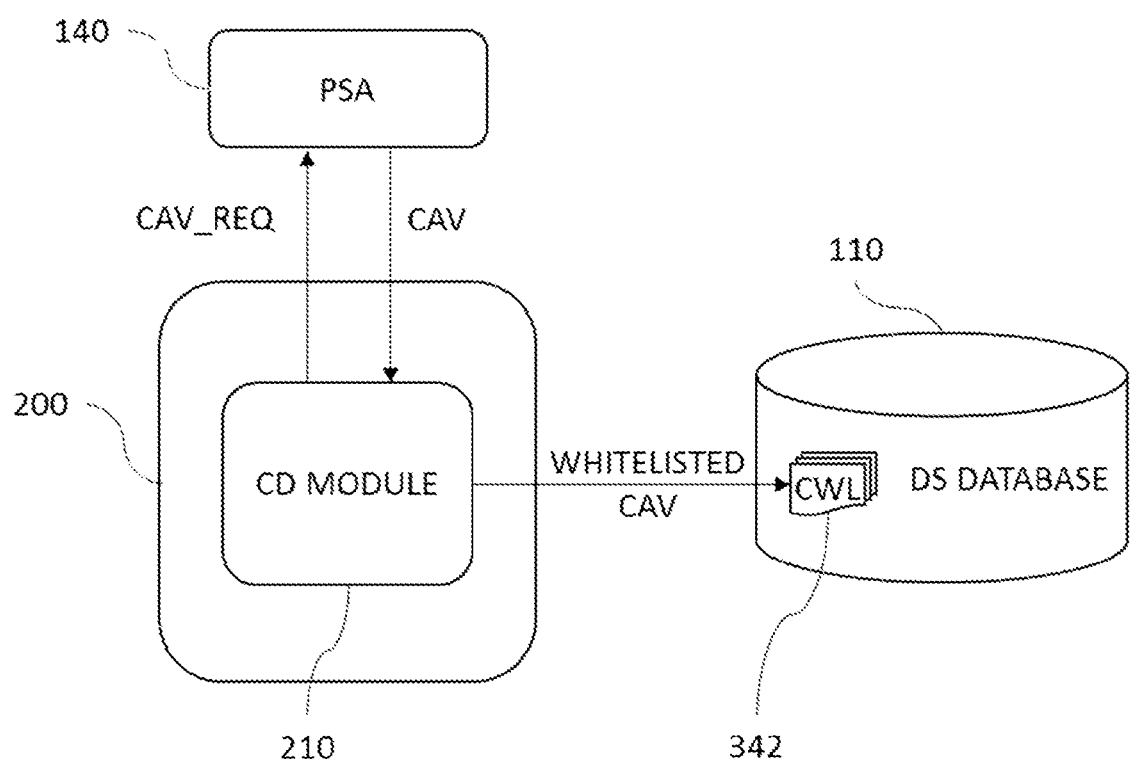

Reference is now made to FIG. 4B, showing a conversations discovery (CD) module 210 of learning engine 200, according to some embodiments of the invention.

CD module 210 is configured to
 a. receive CAVs (further described herein, including in association with the description of PSA module 140) extracted from data packets by the PSA module 140;
 b. add said extracted CAVs to said conversations whitelist (CWL) file 342.

Figure 4C:
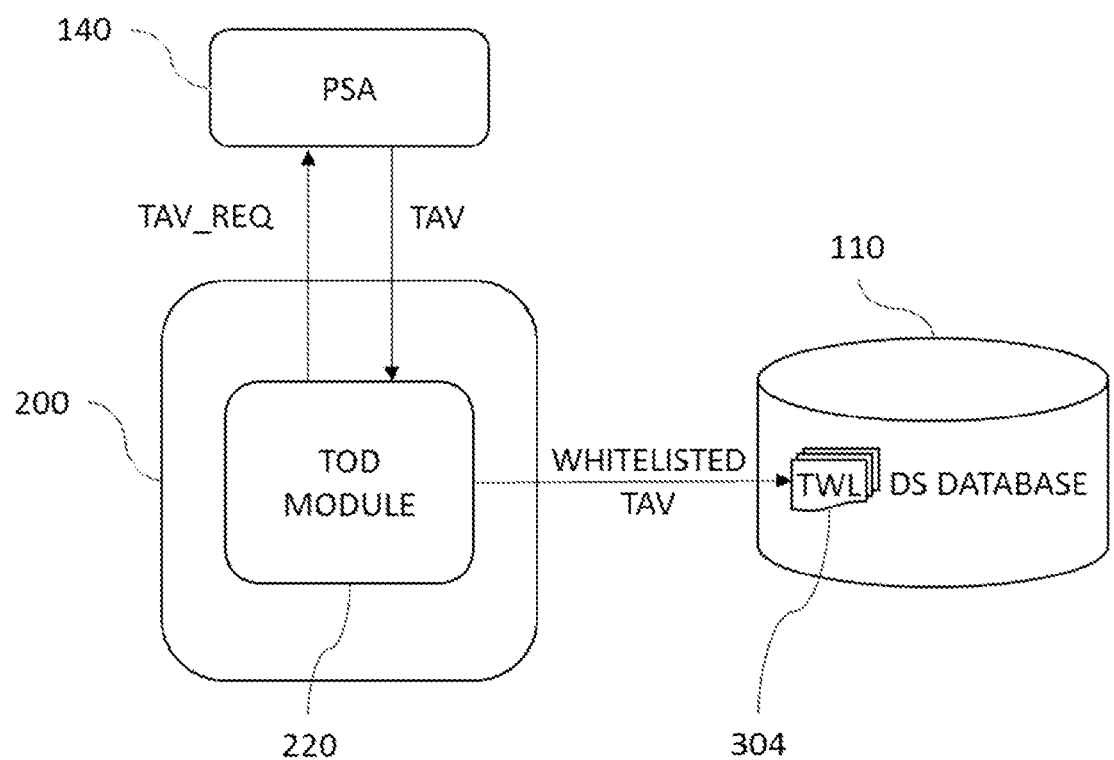

Reference is now made to FIG. 4C, showing a tag-related operations discovery (TOD) module 220 of learning engine 200, according to some embodiments of the invention.

TOD module 220 is configured to:
 a. receive tag-related operation attributes vectors (TAVs) extracted from data packets by PSA module 140;
 b. add the extracted TAVs to tag-related operations whitelist (TWL) file 304.

In some embodiments, defense suite 100 further comprises traffic monitoring modules, displaying traffic information on a user interface of the defense suite.

Figure 5A:
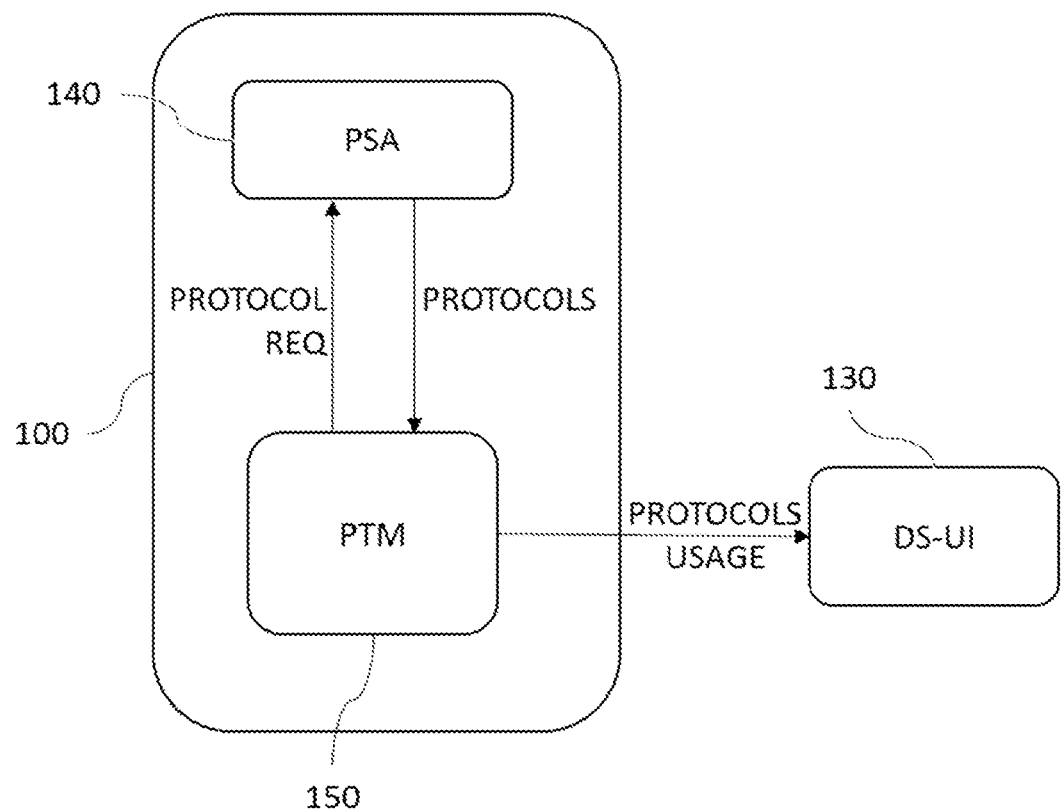
FIGS. 5A-5B show traffic monitoring modules, displaying traffic information on a user interface of the defense suite, according to some embodiments of the invention.

Reference is now made to FIG. 5A, showing a functional block diagram of a protocol traffic monitoring (PTM) module 150 of defense suite 100, according to some embodiments of the invention.

PTM module 150 is configured to
a. receive protocols of assets 7 extracted by PSA module 140 from data packets;
b. compute traffic volume for each protocol; and
c. display traffic volume by protocol on the DS user interface 130.

Figure 5B:
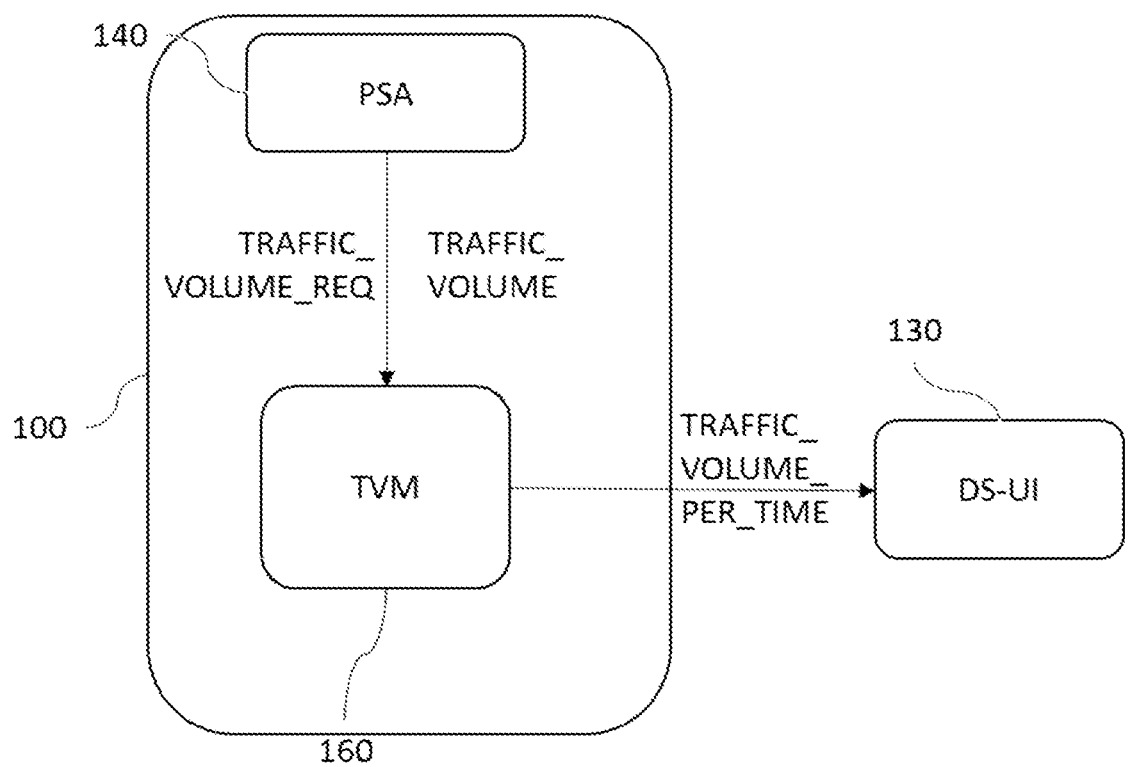

Reference is now made to FIG. 5B, showing a functional block diagram of a traffic volume monitoring (TVM) module 160 of defense suite 100, according to some embodiments of the invention.

TVM module 160 is configured to
a. over each of a sequence of time intervals, sum sizes of packets analyzed by PSA 140 and/or of packets sent and received by NIC 20; and
b. display network traffic volume, comprising the sum of packet sizes over each interval, on DS user interface 130. The display may be numerical (e.g., of a present and previous sums) or in the form of a graph of network traffic vs. time.

In some embodiments, defense suite 100 further comprises an operating-system protection engine (OSPE; further described herein) 400 for protecting HMI-OS 25.

Figure 6A:
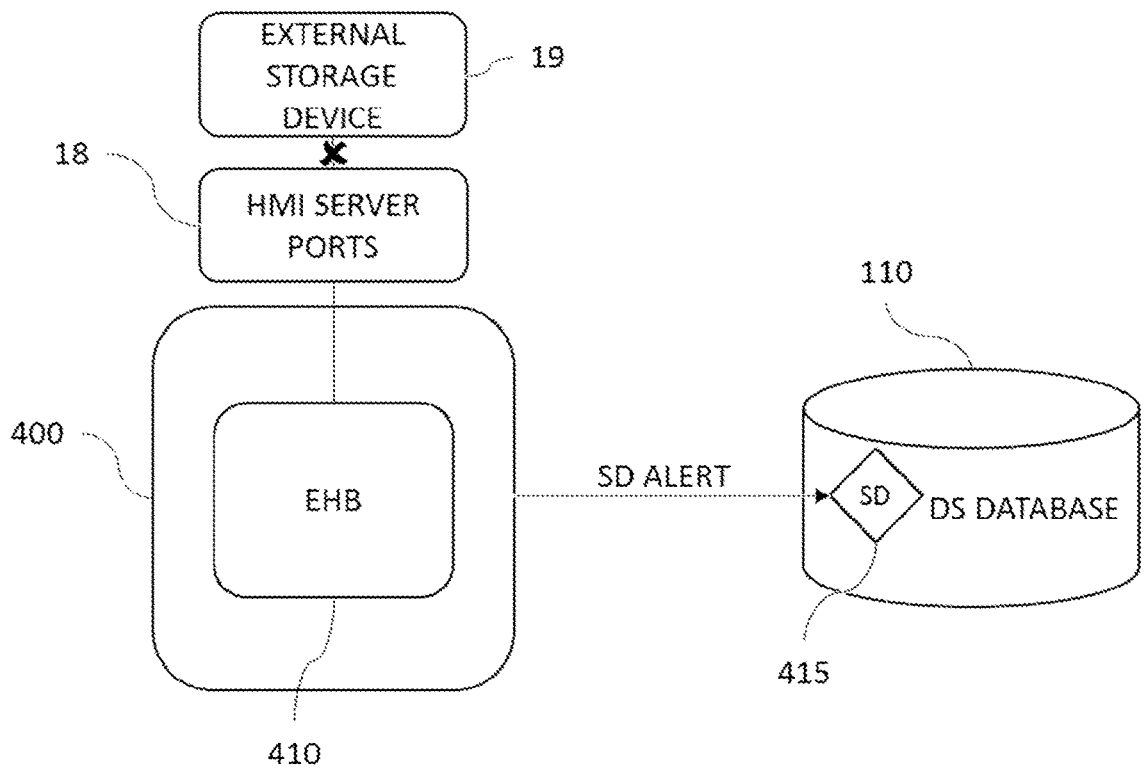
FIGS. 6A-6C show functional block diagrams of operating system protection modules of the defense suite, according to some embodiments of the invention.

Reference is now made to FIG. 6A, showing an external hardware blocking (EBB) module 510 of OSPE 25, according to some embodiments of the invention.

EHB module 510 detects any connection of an external storage device 19 to a physical port 18 of HMI server 15. EHB module 510 blocks external storage device 19 from accessing or 465 communicating with HMI server 15 and HMI-OS 25.

In some embodiments, EBB module 510 may employ native features of HMI-OS 25; e.g., a group policy of Microsoft Windows). An alert may be generated upon an attempt by an external hardware device to access HMI server 15 with external storage device 19. In some embodiments, operation of EBB module may be disabled from DS-UI 130.

In some embodiments, EBB module 410 allows a user to specify which external storage devices 19 are authorized to access HMI server 15. EHB module 510 may be configured to block connections of malicious devices that attempt to impersonate to authorized device like keyboard and mouse.

Figure 6B:
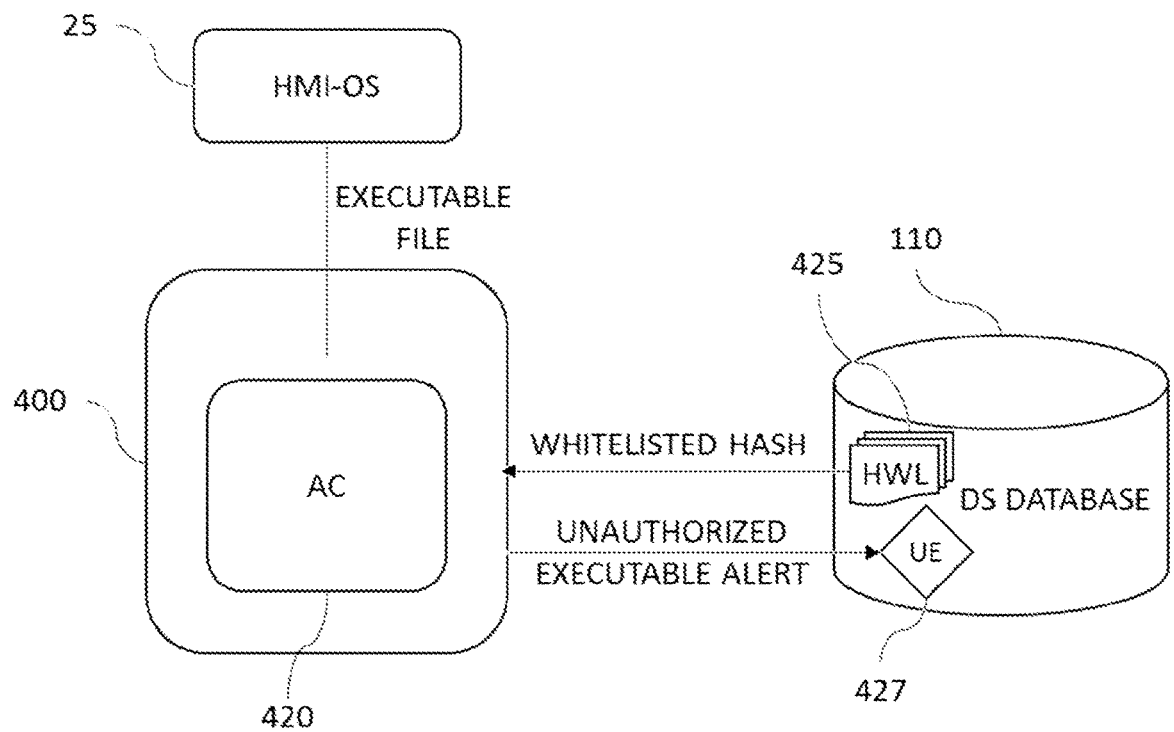

Reference is now made to FIG. 6B, showing an application control (AC) module 420 of OSPE 400, according to some embodiments of the invention. AC module 420 allows only necessary and authorized executables to run on HMI server 15 and blocks unauthorized executables from running on HMI server 15.

After a new executable is loaded in memory of HMI server 15, AC module 420 accesses its code through HMI-OS 25. AC module calculates a hash function (e.g., SHA256) of the new executable. AC module 420 verifies whether the calculated hash is on an executables whitelist (EWL) 425. If the calculated hash is not on executables whitelist 425, the AC module 420 will block execution of the new executable. AC module 420 may also issue an unauthorized executable (UE) alert 427.

In some embodiments, AC module 420 employs internal features of HMI-OS 25 features, such as group policy of Microsoft Windows. AC module 420 may generate an alert when an attempt is made to run an unauthorized executable. Optionally, a user may enable or disable AC module 420. The user may rebuild executables whitelist 425 by initiating a learning period with a program discovery module 430 (further described herein) of OSPE 400.

In some embodiments, AC module 420 enables a user to remove, edit, and add files manually to the EWL 425. AC module 420 may support various types of executables, such as one or more of .EXE, .DLL., .SYS, Windows services, and scripts such as .BAT, .PS1, and VBS.

Figure 6C:
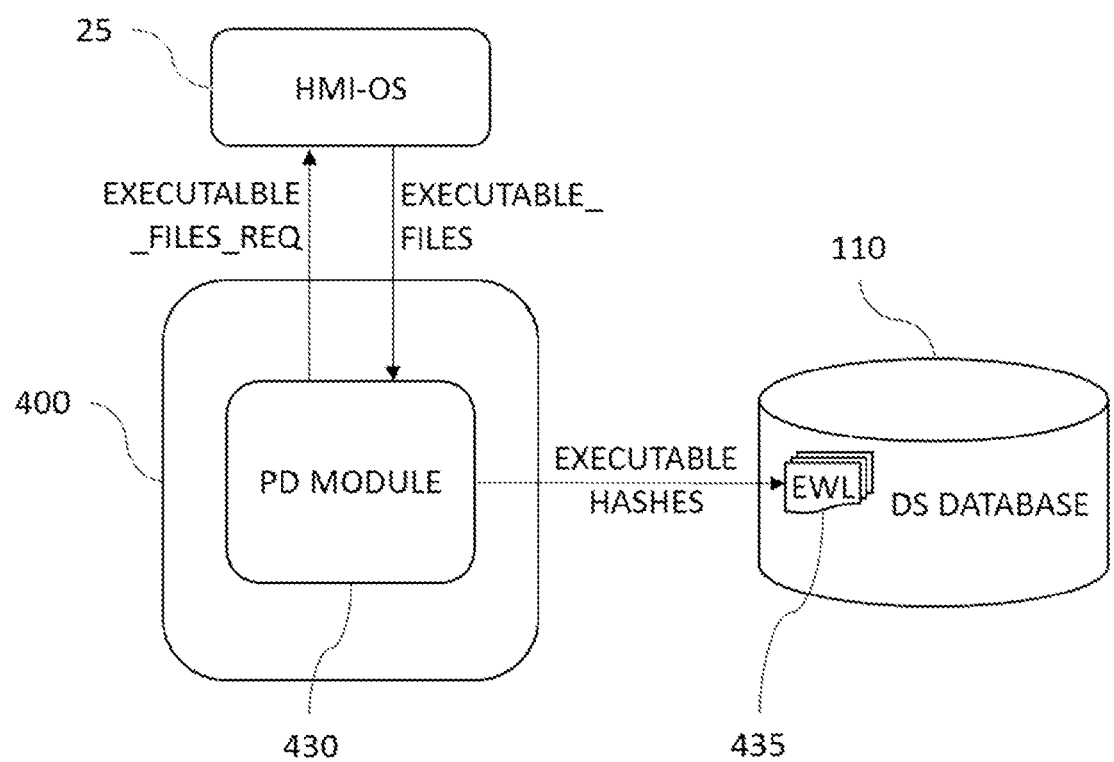

Reference is now made to FIG. 6C, showing a functional block diagram of a program discovery (PD) module 430 of OSPE 400. PD module 430 learns which executables are authorized and serves a learning module for application control (AC) module 420.

PD module 430 is configured to
a. monitor executables running in HMI-OS 25;
b. compute hash function values of each executable; and
c. add the hash function values to said EWL file 425.

In some embodiments, modules of OSPE 400 may also send their alerts (e.g., external hardware alert and unauthorized executable alert) to a syslog server, if present and configured.

Figure 7:
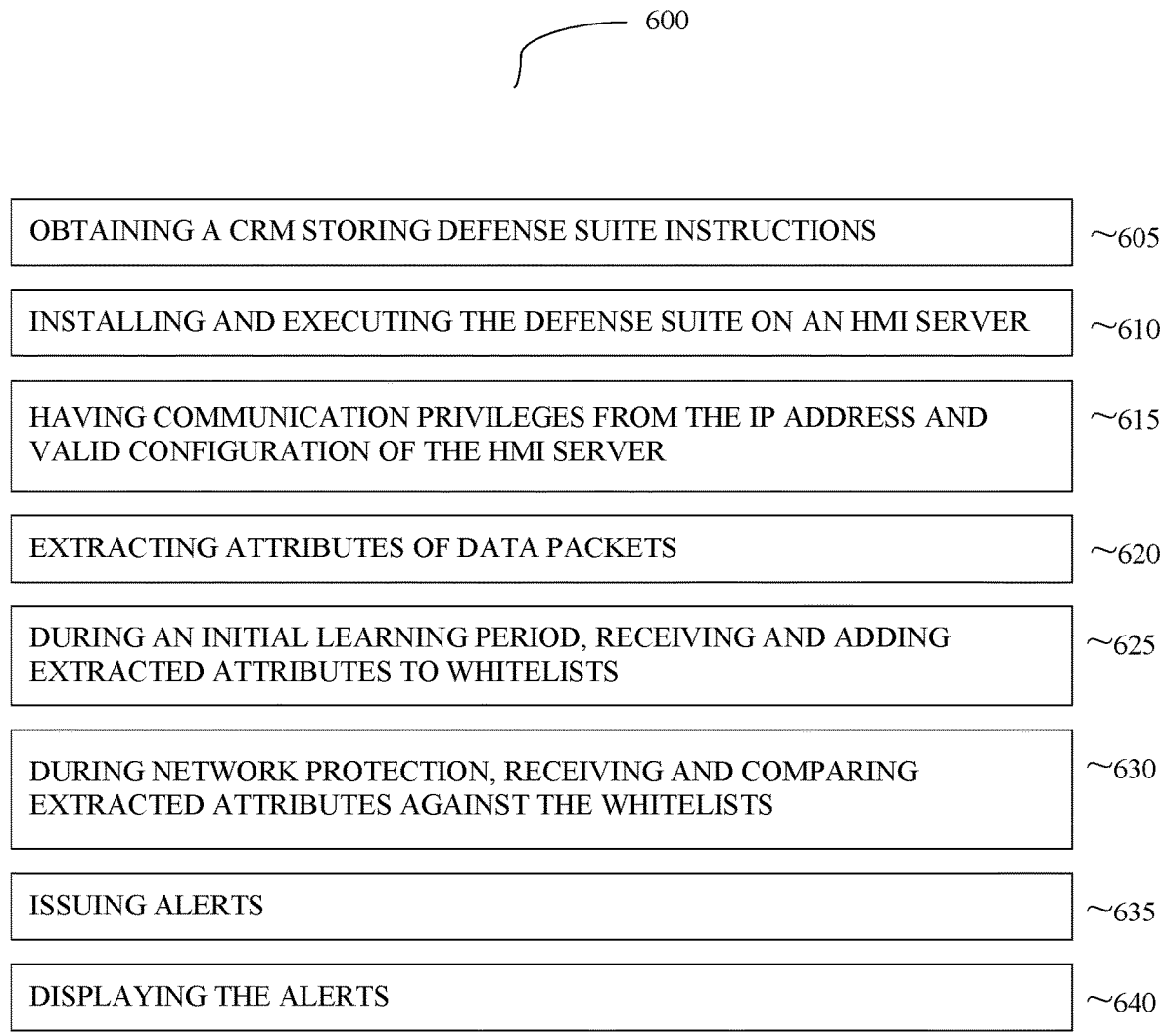
FIG. 7 shows a list of steps of a method for protecting an ICS network, according to some embodiments of the invention.

Reference is now made to FIG. 7, showing a flow chart of a method for protecting an ICS network 5, implemented by one or more processors of an HMI server, the method comprising steps of
a. obtaining a defense suite instructions 605, such as any of those further described herein;
b. installing and executing the instructions method within the HMI server 610;
c. thereby having communication privileges to assets of the ICS network, deriving from a valid IP address and valid network configuration of the HMI server 615; said assets comprising one or more programmable logic controllers (PLCs).
d. extracting attributes of data packets communicated between the HMI server and the assets in the ICS network 620;
e. during an initial learning period, receiving and adding the extracted attributes to one or more whitelists stored on a database 625;
f. during a network protection period,
 i. receiving and comparing one or more of the extracted attributes against one or more attributes in the whitelists 630; and
 ii. issuing an alert upon finding an attribute that does not appear on one of the whitelists 635; and
g. displaying one or more of the alerts on a user interface of the defense suite 640;

APPENDICES

Appendix A

Application Layer Protocol & Port Identification Algorithm

General Description

The application layer protocol & port identification (ALPPI) algorithm recognizes the 525 port and the name of the application layer protocol.

Recognizing the application layer protocol enables the PSA 140 to decide which protocol (for example—HTTP, DNS, FTP, MODBUS, OPC . . . ETC) is used in conversations between the HMI Server 15 and other assets 7 (such as PLCs 10).

Significantly, conversations discovery (CD) module 210 employs the port number of the application layer, computed by PSA module 140, to create conversation rules, which CD module 210 saves in conversations whitelist (CWL) file 342. Additionally, unauthorized conversation (UC) detection module 340 employs the port number computed by PSA module 140 to compare CAVs of each communicated packet with whitelisted CAVs in CWL file 342.

Conversation rules must each include a port number that is used as the constant destination port to start a conversation between the assets (this is the port that belongs to the application layer protocol), because the source port is always a random port (a number between 1024 to 65535). However, the packet that started a conversation may have been sent before the DS 100 was installed on the HMI server 25. Therefore PSA module 140 cannot rely on using the destination port of the first packet; instead it must find the port number that belongs to the application layer protocol.

For example, if the HMI server 25 is accessing a web server in a known application layer protocol, HTTP, a port number of 80 is used (as the destination port to access the web server's web service). In such a case, in a first packet the source port number is random (e.g. port 35502) and the destination port is 80. In a second packet, from the web server to the HMI server 25, the source port is 80 and the destination port is 35502. Therefore we need an algorithm that will help PSA module 140 decide which one of the ports belongs to the service (to the application layer protocol, HTTP in this case). In the next conversation between the HMI server 25 and the web server, the source port that was 35502 will most probably be renumbered, therefore the CD module 210 cannot employ the source port number in the conversation rule.

Additionally, protocol traffic monitoring (PTM) module 150 and traffic volume monitoring (TVM) module 160 employ application layer protocols to show the user the network traffic volume per each protocol, and the list of protocols that the HMI server used communicates with each asset.

There are two algorithms for determining which is the application port number. A first algorithm is used for quick identification of the port that belongs to the application layer protocol. A second algorithm identifies ports that the first algorithm could not identify and finds mistakes that happened using the first algorithm.

First Algorithm for Identifying the Port that Belong to the Application Layer Protocol If the two ports (the src_port and the dst_port) are identical—return one of them;
If one of the ports is greater than 1024 and the other one is lower than 1024 return the lower one. (ports under 1024 are called "reserved ports" and they belong to services);
If one of the ports is in the known ports list of Internet Assigned Numbers Authority (IANA) and the other port is not in the list—then return the port that is found in the IANA ports list. (The IANA ports list contains ports that usually belong to services and the service name the port belongs to)
If one of the ports is matched to internal protocols rules of the DS 100, and the other port is not matched to a DS internal rule—then return the matched port.
If none of these methods expose the port number that belong to the application layer protocol—the second algorithm will find it.

Second Algorithm for Identifying the Port that Belong to the Application Layer Protocol As described above, the second algorithm will expose the ports that the first algorithm failed to find. Additionally the second algorithm updates the results of the first algorithm if it finds a correction which should be made. The second algorithm comprises steps of Extracting the src_port and the dst_port from the packet;
Saving the pair of ports in a list of ports pairs in the DS-DB 110;
Waiting until one and only one port of one pair will be reused in another conversation;
Marking the reused port as port that belong to a service.
Reset the list of port pair every day. The resetting of port pairs promises that the same random port number is not concurrently assigned twice.
Explanation—since the src_port numbers are random ports, they are not going to be reused in another conversation (in a time window of 24 hours), but the dst_port is constant, and always belongs to the service that runs on the server—which means it is reused each time the asset (client) starts a new conversation with the server.

After identifying the port number, PSA module 140 uses the application layer protocol name algorithm to identify the protocol name.

Algorithm for Identifying the Name of the Application Layer Protocol (Service Name)

Check the DS internal protocols rules (mentioned in the first algorithm); if a protocol rule is found that matches the port number (found by the previous two algorithms), the application layer protocol name is from the matching rule.
Check IANA ports to services list rules (mentioned in the first algorithm); if an entry in the IANA list is found that match the port number (found by the previous two algorithms) the application layer protocol name is from the matching entry.
If neither of these methods exposes the application layer protocol name, the application layer protocol is saved as "unknown"; this will not damage the system whitelist or the alerting mechanism because the whitelist is based on the port number, not the application layer protocol name. However, the protocol name will appear as "unknown" in the DS-UI 130.

Appendix B

Details Regarding an Asset Discovery Algorithm

Definitions

1. Passive asset discovery algorithm—an algorithm created to define how to discover assets through capturing of network packets (passively—without sending any packets to assets in the network).

2. Broadcast packets—Broadcast packets are packets that are sent from one source to all the assets on the same network (same LAN).

3. ARP packets—ARP is a protocol used to discover the MAC address of an asset by its IP address, ARP packets are broadcast packets. In a LAN, assets periodically send ARP packets in order to discover the MAC addresses of their neighbors, so they are able to communicate with them.

4. SRC IP—the source IP address of a network packet.

5. SRC MAC—the source MAC address of a network packet.

In some embodiments, the asset discovery module of the learning engine and the detection module are employing a passive asset discovery algorithm with the above defined resources.

Operation of Asset Discovery Module

A. Asset discovery by ARP packets—
There are two types of ARP packets:
1. ARP request—a packet with a request from one asset that wants to discover the MAC address of a specific IP address An ARP request packet is broadcast to network (LAN) 620 assets. The ARP request packet contains the MAC address and the IP address of the assets who sent the ARP request.
2. ARP response—a packet with a response to an ARP request. An ARP response packet contains the IP address and the MAC address of the responding asset (which is the answer to the ARP request).

Upon capturing ARP network packets, PSA module 140 extracts the IP address and MAC address from the ARP packets; in so doing PSA module 140 is discovering an asset.

B. Asset discovery employing SRC MAC and SRC IP of BROADCAST packets—

When capturing network packets, PSA module 140 can recognize broadcast packets and extract the source MAC address and source IP address from those packets. By extracting the MAC and IP addresses, PSA 140 discovers an asset—because the source of a packet sent in a broadcast signifies that the source is an asset existing on the same LAN as the HMI Server 15.

\*\*\*Note: The packets referred to in clauses A and B above are special because are contain a MAC address and corresponding IP address of an asset. In most cases, the SRC MAC and the SRC IP do not belong to the same device, as the SRC MAC is usually the MAC address of the network device which routed the packet and the SRC IP is the IP address of the actual asset that sent the packet.

C. Asset Discovery Employing Source IP Address

When capturing network packets, PSA module 140 can extract the source (SRC) IP address from the packets. If it's the first time the extracted IP address is encountered during the learning period, asset discovery (AD) module 205 adds this IP address alone (for now) to assets whitelist 322. During operation of new asset (NA) detection module 320, if an IP is internal (belonging to the LAN subnet of HMI server 25), the system will check for an "IP CHANGED" event (as will be explained later). If the IP address is external, NA detection module 320 issues an alert immediately.

1) Discovery of an IP CHANGED event inside the LAN

An IP address is a logical address, not a physical one; a user can always change an IP address (unlike a MAC address, which is constant). When a user changes the IP address of an asset 7, the NA module 320 must recognized the change; otherwise it will issue a false positive new asset alert 324.

Therefore, if the NA module 320 encounters a packet with a new IP address, if it belongs to the internal LAN it won't raise an NA alert 324; rather, NA module 324 waits for a packet that contains the MAC address that belongs to the new IP address, like the ones that mentioned in clauses A and B above. If the MAC address that the system discovered is also not on AWL 322, the NA module 320 immediately issues an alert, If the MAC address is on AWL 322 but the IP address is new—NA module 320 recognizes it as an IP CHANGED event.

\*Note: The MAC address is a physical address and it is the unique identifier of an asset.

2) Discovery of single asset (single NIC) with many IPs and one MAC

A network administrator can configure more than one IP address to one asset (and to one network interface card). NA module 320 and AD module 205 should be able to recognize that multiple IP addresses belong to a single asset, otherwise it would incorrectly interpret the IP addresses as belonging to different assets.

To do so, NA module 320 and AD module 205 check if there is one MAC address which belongs to more than one IP address simultaneously (this is done only by analyzing packets like the ones that mentioned in clauses 1 and 2—because they contain a MAC address and its corresponding IP address), NA module 320 and AD module add the IP address to the same asset (with the asset's single MAC address).

The invention claimed is:

1. An abnormal human-machine interface (HMI) behavior (AHB) detection module of an HMI server in an industrial control system (ICS) network, the AHB detection module of the HMI server comprises one or more hardware processors configured to:
   a. monitor activity of input devices of the HMI server, wherein the input devices comprise a keyboard and a mouse;
   b. receive tag-related operation attribute vectors (TAVs) extracted by a packet sniffing and analysis module (PSA) module from each data packet communicated between said HMI server and one or more programmable logic controllers (PLCs), wherein the PSA module comprises one or more hardware processors configured to:
      i. obtain data packets communicated between the HMI server and assets in the ICS network, wherein the assets comprise one or more PLCs, wherein the HMI server comprises communication privileges while communicating with the assets, and wherein the communication privileges are determined based on attributes of the received TAVs; and
      ii. extract attributes of the obtained data packets;
   c. compare the monitored activity to data packets communicated between the HMI server and the assets in the ICS network;
   d. compare said extracted TAVs with whitelisted tag-related operations attributes in a tag-related operations whitelist (TWL) file in said database;
   e. if the packet was sent from the HMI server to a PLC and extracted TAVs are not in the TWL and is not preceded by activity of input devices of the HMI server within a maximum interval before said tag-related operation, then issue a new tag-related operation (NT) alert; and
   f. if the packet is sent from a PLC to the HMI server and said extracted TAVs are not in said TWL, then issue a new tag-related operation (NT) alert,
   wherein each received TAV comprises a tag's operation, a tag's address and a tag's value.

2. The AHB detection module of claim 1, wherein said maximum interval between said input device activity and said tag-related operation is 0.5 seconds.

3. The AHB detection module of claim 1, wherein the TAVs are received during a learning period.

4. A method of detecting abnormal human-machine interface (HMI) behavior of an HMI server in an industrial control system (ICS) network, the method comprising:

monitoring, by a processor, activity of input devices of the HMI server, wherein the input devices comprise a keyboard and a mouse;

receiving, by the processor, tag-related operation attribute vectors (TAVs), extracted by a packet sniffing and analysis module (PSA) module, from each data packet communicated between the HMI server and one or more programmable logic controllers (PLCs);

obtaining, by the processor, data packets communicated between the HMI server and assets in the ICS network, wherein the assets comprise one or more PLCs, wherein the HMI server comprises communication privileges while communicating with the assets, and wherein the communication privileges are determined based on attributes of the received TAVs;

comparing, by the processor, the monitored activity to data packets communicated between the HMI server and the assets in the ICS network;

extracting, by the processor, attributes of the obtained data packets;

comparing, by the processor, the extracted TAVs with whitelisted tag-related operations attributes in a tag-related operations whitelist (TWL);

if the data packet was sent from the HMI server to a PLC and the extracted TAVs is not in the TWL, and is not preceded by activity of the input devices within a maximum interval before the tag-related operation, issuing, by the processor, a tag-related operation alert; and if the packet is sent from the PLC to the HMI server and the extracted TAVs is not in the TWL, issuing, by the processor, a tag-related operation alert, wherein each received TAV comprises a tag's operation, a tag's address and a tag's value.

5. The method of claim 4, wherein the maximum interval between the input device activity and the tag-related operation is 0.5 seconds.

6. The method of claim 4, wherein the TAVs are received during a learning period.

\* \* \* \* \*